(12) United States Patent
Prasad et al.

(10) Patent No.: US 8,730,995 B2
(45) Date of Patent: *May 20, 2014

(54) SYSTEM AND METHOD FOR ENABLING RADIO OPERATIONS ON A WIRELESS COMPUTING DEVICE

(75) Inventors: Srikiran Prasad, Cupertino, CA (US); Arun Mathias, Sunnyvale, CA (US); Darren Ang, Mountain View, CA (US); Thomas Schmidt, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/533,693

(22) Filed: Jun. 26, 2012

(65) Prior Publication Data

US 2012/0270508 A1  Oct. 25, 2012

Related U.S. Application Data

(63) Continuation of application No. 12/692,578, filed on Jan. 22, 2010, now Pat. No. 8,238,364, which is a continuation of application No. 11/302,524, filed on Dec. 12, 2005, now Pat. No. 7,675,933.

(60) Provisional application No. 60/719,811, filed on Sep. 23, 2005.

(51) Int. Cl.
*H04J 3/16* (2006.01)

(52) U.S. Cl.
USPC ........... 370/465; 370/328; 370/437; 370/392; 370/471; 370/566

(58) Field of Classification Search
USPC ................. 370/310, 328, 466, 437, 471, 465; 455/466
See application file for complete search history.

(56) References Cited

U.S. PATENT DOCUMENTS

| 6,211,858 B1 | 4/2001 | Moon et al. |
| 6,223,059 B1 | 4/2001 | Haestrup |
| 6,721,288 B1 | 4/2004 | King et al. |
| 7,454,164 B2 * | 11/2008 | Goss ............................ 455/3.01 |

(Continued)

OTHER PUBLICATIONS

International Search Report mailed Apr. 16, 2007, for PCT Application No. PCT/US2006/036980.

(Continued)

*Primary Examiner* — Ajit Patel
*Assistant Examiner* — Julio Perez
(74) *Attorney, Agent, or Firm* — Mahamedi Paradice Kreisman LLP (57) ABSTRACT

Embodiments of the invention provide for a wireless computing device that comprises a set of one or more radio components to transmit and receive wireless communications on the device. Additionally, the wireless computing device includes processing and memory resources that individually or in combination provide multiple wireless applications, a radio object, and an arbitration component. The multiple wireless applications are each capable of generating a user-interface for enabling user-input in connection with wireless activities performed with that wireless application. The radio object interfaces the multiple applications with the set of one or more radio components. The arbitration component is configured to arbitrate at least one of (i) requests made by each of the wireless applications to the radio object for access to one or more of the radio components in the set, or (ii) responses from the radio object to requests made by each of the wireless applications.

15 Claims, 5 Drawing Sheets

(56) References Cited

U.S. PATENT DOCUMENTS

| | | | |
|---|---|---|---|
| 2003/0013483 A1 | 1/2003 | Ausems et al. | |
| 2004/0131078 A1* | 7/2004 | Gupta et al. | 370/466 |
| 2004/0199614 A1 | 10/2004 | Shenfield et al. | |
| 2005/0009561 A1 | 1/2005 | Hollstrom et al. | |
| 2005/0213763 A1* | 9/2005 | Owen et al. | 380/270 |
| 2005/0238046 A1 | 10/2005 | Hassan et al. | |
| 2010/0011417 A1 | 1/2010 | Adams et al. | |

OTHER PUBLICATIONS

International Preliminary Report on Patentability issued Mar. 26, 2008, for PCT Application No. PCT/US2006/036980.

* cited by examiner

SYSTEM AND METHOD FOR ENABLING RADIO OPERATIONS ON A WIRELESS COMPUTING DEVICE

RELATED APPLICATION

This application is a continuation of U.S. patent application Ser. No. 12/692,578, filed Jan. 22, 2010, now U.S. Pat. No. 8,238,364 which is a continuation of U.S. application Ser. No. 11/302,524, filed Dec. 12, 2005 (now U.S. Pat. No. 7,675,933), which claims benefit of priority to U.S. Provisional Patent Application No. 60/719,811, filed on Sep. 23, 2005; all of the aforementioned applications being hereby incorporated by reference in their entirety for all purposes.

TECHNICAL FIELD

The disclosed embodiments relate generally to the field of wireless computing devices. In particular, the disclosed embodiments relate generally to a system and method for enabling radio operations on a wireless computing device.

BACKGROUND

Communication devices have evolved to include numerous types of communication capabilities and functionality. For example, handheld devices exist that operate as cellular phones, messaging terminals, Internet devices, while including personal information management (PIM) software and photo-management applications.

Mobile phone networks have traditionally been limited to voice communications, but new technologies such as GSM (Global System for Mobile Communications) have enabled mobile phone networks to also include data communications. For example, SMS (Short Message Service) messaging provides a software-independent protocol to send short text messages composed of either: 160-7 bit characters; 70-16 bit characters; or 140 octets of binary data. Individual SMS messages thus require a relatively small network bandwidth and devices can receive messages, even when connected to a voice call. The number of SMS messages a user receives has continually increased because many new types of network devices have joined mobile phone networks. These devices include, for example, PDAs, hybrid PDA/mobile phone devices, and other text messaging devices using GSM networks.

Given market demands and technological advances, wireless computing devices are updated rapidly in software and hardware. For example, cellular phones have evolved from carrying analog signals to carrying digital signals. Currently devices are transitioning from 2.0 and 2.5 GHz bands to 3 GHz bands ("3G" networks), on which better broadband support for transfer of large data amounts will be possible.

With new developments in wireless applications and networks, numerous manufacturers, platforms and applications have come into existence for such devices. Increasingly, software development and compatibility are issued with such devices.

DETAILED DESCRIPTION

Embodiments of the invention enable radio operations on a wireless computing device. In particular, embodiments described herein provide for the radio objects that facilitate and enable wireless activity to take place using radio resources of a device that are independent of device hardware and platform. Furthermore, embodiments of the invention provide for better use of radio communication resources by multiple applications through features such as arbitration and message communications.

Embodiments described herein enable the modularization of architecture for enabling wireless communications across different platforms and devices. In an embodiment, much of the logic and programming for enabling wireless applications to use radio communication hardware is made device and platform independent. According to one embodiment, for example, a radio object may be provided as a complete and modular entity, that can be implemented on multiple types of devices and/or provided with different operating systems.

Embodiments of the invention provide for a wireless computing device that comprises a set of one or more radio components to transmit and receive wireless communications on the device. Additionally, the wireless computing device includes processing and memory resources that individually or in combination provide multiple wireless applications, a radio object, and an arbitration component. The multiple wireless applications are each capable of generating a user-interface for enabling user-input in connection with wireless activities performed with that wireless application. The radio object interfaces the multiple applications with the set of one or more radio components. The arbitration component is configured to arbitrate at least one of (i) requests made by each of the wireless applications to the radio object for access to one or more of the radio components in the set, or (ii) responses from the radio object to requests made by each of the wireless applications.

Examples of wireless computing devices that may be configured under one or more embodiments include a cellular telephone device with messaging capabilities, including devices such as "smart phones" which are provide functionality that includes messaging (e.g. email and instant messaging), cellular telephony, WiFi and/or Bluetooth connectivity, and other functionality such as digital photography and media playback.

Unless stated otherwise, components such as the radio object and the arbitration component may be implemented as software, hardware, firmware or a combination thereof. In one embodiment, the radio object and the arbitration component are low-level software, operating beneath the operating system.

According to one embodiment, the arbitration component enables requests from two or more of the wireless applications to be handled asynchronously by the radio object.

According to another embodiment, the arbitration component forwards requests from the wireless applications to the radio object using messages.

In a situation where some of the wireless applications communicate with the radio object using function calls, one embodiment provides that the programming and logic includes an interface that converts each function call to a corresponding message. One type of information that can be communicated in a message is version.

In another embodiment, the computing device includes a plurality of radio modules. Each radio module includes one or more components for performing at least one of transmitting and receiving wireless data in a corresponding wireless communication medium and under a corresponding protocol. Additionally, processing and memory resources are provided that, in combination or individually, provide a wireless application for enabling a particular type of wireless communication using anyone of the plurality of radio modules. A plurality of radio objects are each configured to process a request for a communication of the particular type using a radio module in the plurality of radio modules that corresponds to that radio object. A manager is configured to select one of the plurality of radio modules to handle the communication.

Another embodiment provides one or more radio object components, that each include instructions for handling communication requests originating from at least one corresponding wireless communication application for use by a radio module of the wireless computing device. An operating system abstraction is provided that includes instructions for interfacing each of the one or more radio object components with an operating system of the wireless computing device. Additionally, a hardware interface is configured to interface each of the one or more radio object components with device hardware on the wireless computing device. The one or more radio object components are independent of the operating system abstraction and the hardware interface.

Furthermore, embodiments described below provide for several features and variations, including arbitration of requests for radio resources, message architecture, modularized components of software radio resources (e.g. radio objects), and use of multiple types of radio resources. It is contemplated that all such embodiments described may be implemented in a single device. However, it is also contemplated that the various embodiments and features may be implemented individually, without the presence of other features from other embodiments. Thus, for example, an embodiment in which an arbitration component is provided for radio communications may or may not be implemented with a message architecture, or with modularized components of software radio resources, as described with other embodiments.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. A specific type of machines on which embodiments described herein can be provided include wireless computing devise, such as cellular phones, wireless messaging devices, hybrids or smart phones and other devices capable of wireless communications. In particular, the numerous machines shown with embodiments of the invention include processor(s) and various forms of memory for holding data and instructions. Such devices and functionality may alternatively be referred to as processing and memory resources, as well as logic (e.g. programming or bit coding). Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

Radio Object Arbitration

Figure 1:
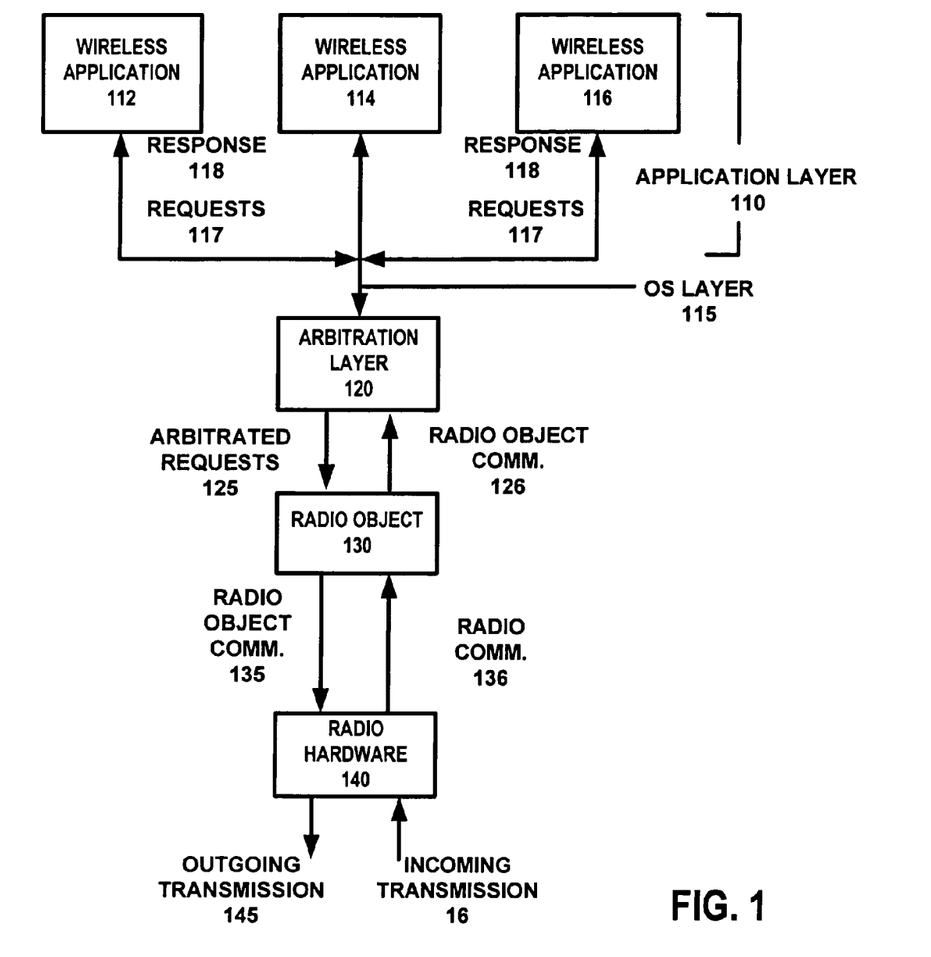
FIG. 1 illustrates an architecture for a wireless computing device, under an embodiment of the invention.

FIG. 1 illustrates an architecture for a wireless computing device, under an embodiment of the invention. In an embodiment, a device 100 includes an application layer 110, an operating system layer 115, an arbitration component 120, a radio object 130 and a radio hardware module 140. Together, these elements enable a user of the device 100 to initiate and/or conduct wireless communication activities of various types. Typical examples of such activity include voice calls and wireless messaging (such as text or image messaging). Specific examples of such wireless activity include voice communications (cellular phone or push-to-talk), SMS messaging, Multimedia Messaging Service (MMS) messaging, instant messaging (e.g. with open socket connection), email, and web browsing. Additional activities may also include transfer of files and media, such as by way of streaming media.

To this end, wireless application layer 110 includes one or more wireless applications 112, 114, and 116. The wireless applications 112-116 may provide user-interfaces and functionality for enabling the user to initiate and perform specific wireless communication activities. These applications 112-116 are to layered applications, as compared to the operating system 115. An implementation provided in FIG. 1 provides for the arbitration component 120 and radio object 130 to be provided as lower level software with respect to the operating system 115. Alternative implementations may be used, such as an implementation in which the arbitration component 120 is provided above or at the level of the operating system layer 115. Some or all of the wireless applications 112-116, as well as the arbitration component 120 and the radio object 130 may be configured for use with the particular operating system employed on the device. The application layer 110 is generally device and radio independent. But the arbitration component 120 and the radio object 130 may have to accommodate the operating system, the device hardware (not shown), and the radio module hardware 140. Typically, the radio hardware module 140 may comprise components for coding, modulating, amplifying and radiating on outgoing communications, and receiving (e.g. antenna), amplifying, demodulating, and decoding on incoming communications. Examples of the different types of wireless communications include cellular network transmissions, short range radio frequency communications, and Infrared communications. Examples of cellular network transmissions include communications handled under protocols such as CDMA or TDMA (such as the TDMA air interface), PCS, communications for GSM networks, and dual, tri-, or quad-mode hybrids that can communicate across multiple bandwidths using different protocols. Examples of short range radio frequency communications include Wireless Fidelity or 802.11b ("WiFi") or Bluetooth communications.

Examples of the wireless applications 112-116 include a phone application for enabling a person to initiate, receive and/or conduct one or more phone calls carried over cellular networks. Other examples of wireless applications 112-116 include messaging applications (e.g. SMS, MMS, instant messaging, email), and data applications such as a web browser which can browse the Internet over a wireless data channel. In addition to the phone application, other types of voice-exchange applications may be provided, such as push-to-talk or walkie-talkie type voice communications.

The radio hardware module 140 may include a chip with on-board and/or external wireless transmission and reception component. The radio hardware module 140 may also include related logic and devices in order to provide for a specific type and protocol of wireless communications. For example, radio hardware module may include devices, components, and programming for transmitting and receiving wireless communications of a specific type, protocol, and even from or over a specific medium (e.g. a particular bandwidth of radio-frequency transmissions).

According to an embodiment, radio object 130 includes one or more programs, applications, and/or other logical component that connect, or establish a connection, between the different applications 112-116 of application layer 110 and the radio hardware module 140. The radio object 130 may be closely tied to the radio hardware module 140 in order for the radio object to accommodate the specifications and requirements of the radio hardware. The radio object 130 is configured to translate requests (and possibly other types of communications) from the applications 112-116 into a format and structure dictated by the requirements of the radio hardware module 140. Under one common implementation, the radio object 130 has a one-to-one relationship with the radio hardware module 140. In many cases, the radio object 130 and radio hardware module 140 are configured for a device by a common party, and also to operate on multiple operating systems. For example, if a wireless messaging application generates a message, the radio object may include a component that produces the data package that is converted by the radio module 140 into a signal that carries the message from the device. With a typical approach of the past, the radio object 130 and its components were all designed for a device and its platform. In contrast, embodiments described below (e.g. FIG. 3 and FIG. 4) enable significant portions and components of the radio object 130 to be modularized so as to be device and operating system independent.

In an embodiment, device 100 includes the arbitration component 120 for regulating and/or controlling the use of radio hardware module 140 by the applications 112-116 of the application layer 110. In one implementation, arbitration component 120 arbitrates requests made by applications 112-116 to the radio object 130 for access to the radio hardware module 140. When multiple applications request use of radio hardware module 140, arbitration component 120 allocates the resources of that module to accommodate the multiple requests. The requests may then be handled sequentially, or in clusters, depending on the capabilities of the radio hardware module 140.

With reference to FIG. 1, the wireless applications 112-116 may submit radio object requests 117. In response to receiving each radio object request 117, arbitration component 120 provides an arbitrated request 125 to the radio object 130. In one implementation, arbitrated requests 125 may correspond to the radio object requests 117, with sequencing, ordering, timing, or other mechanisms to enable allocation of resources provided by the radio object 130 or the radio hardware module 140. A protocol or other set of rules may be used to establish how radio object requests 117 are to be arbitrated.

Additionally, arbitration component 120 may arbitrate responses, acknowledgements, or other forms of communications to the applications 112-116 from the radio object 130. In particular, responses and acknowledgements may be internally generated, and returned to the applications 112-116 from the radio object 130 and arbitration component 120. Thus, if the radio hardware module 140 communicates a response to a request from one of the wireless applications, the arbitration component 120 may allocate resources as needed for the response to be forwarded to that same wireless application.

As between the radio object 130 and the radio hardware module 140, arbitrated requests 125 are processed into an outgoing radio object communication 135 that communicates the data transmission 145 needed from the radio hardware module 140. For example, as will be described, a component of the radio object 130 may be designated to handle requests from a particular application 112-116. This component may package data necessary for enabling the outgoing data transmission 145 to be generated by the radio hardware module 140. For example, a request originating from a text messaging application may correspond to a text message that is provided a header, then structured by the radio object 130 to have a formatted body (e.g. as in the format, size and structure of an SMS message), then forwarded as the radio object communication 135 to the radio hardware module 140. The radio hardware module 140 signals the outgoing data transmission 145, which, in the example recited, may correspond to a radio-frequency signal that carries the particular SMS message. As another example, a request may originate from a phone application in the form of a phone number dialed by the user, with an action to connect a call (e.g. the user presses "send"). In response to the request, the radio hardware module 140 may attempt to establish a cellular telephone connection using a phone number specified in the request.

The radio object 120 may also forward incoming communications to the wireless applications 112-116. Such communications may be in the form of responses or acknowledgements to requests made by the wireless applications. In one implementation, internal acknowledgements may be generated from the radio hardware module 140 and forwarded by the radio object 130 to a given one of the wireless applications 112-116 when a given task was successfully performed. One example may correspond to an internal message when a telephony message (e.g. SMS message) or even email is sent, in response to the corresponding messaging application making the request to have the message transmitted. The same acknowledgement may communicate failure, such as when the email was not sent, or when the device is out of cellular coverage to make a phone call. Internal acknowledgements may originate from the radio hardware module 140, from the radio object 130, and/or from the arbitration component 120, or even from the operating system or other components.

In addition to internal acknowledgements and notifications, radio object 130 may forward externally generated communications 146 (incoming message). Such communications may include externally generated acknowledgements which are automatically generated in response to specific events. For example, some wireless carriers generate acknowledgements for SMS messages. Other types of externally generated communications include incoming messages from other computing devices (e.g. incoming email or SMS message). Still further, the incoming communication may correspond to the placement of a cellular phone call initiated by another device, and the incoming communication is intended to establish a voice connection with a phone application.

For externally generated communications, the incoming data transmission 146 may be received by the radio hardware module 140 as the physical layer, then converted into an incoming radio communication 136 for the radio object 130. One of the components of the radio object 130 may determine which application is to receive the incoming radio communication 136. The radio object 130 may generate a upward-directed radio object communication 126, which is received by the arbitration component 120 and then arbitrated to the applications 112-116 as a response 118. Internally generated acknowledgements and responses may also be passed upward to the applications 112-116 from the respective components in a similar fashion. For example, an acknowledgement that a message has been transmitted may originate from the radio hardware module 140 and be forwarded to the applications 112-116.

One result provided is that the device 100 can multi-task operations relating to wireless communications, particularly when more than one wireless application 112-116 is involved. For example, in one embodiment, a user may initiate an SMS message while initiating or being on a voice call. For example, the arbitration component 120 may arbitrate an incoming or outgoing request to establish a phone call from or with a phone application with a request to transmit an outgoing text message. In one implementation, the request to establish the phone call may be stacked before or after the request for the radio hardware module 140 to send the text message. Thus, the radio hardware module 140 needs to process only one request at a time.

In addition to functions such as described above, an embodiment provides that arbitration component 120 enables asynchronous handling of requests from wireless communication applications 112-116. This allows the device 100 to initiate multiple operations from different wireless communication applications at one time. Asynchronous handling means that the arbitration component 120 can queue multiple requests, as well as responses. For example, if a user wishes to transmit a text message, the request that initiates the text message may be received by the arbitration component 120. Immediately thereafter, the application that initiates the request is free to perform other tasks, and more generally, the device is capable of being used for other wireless activities. Thus, the device as a whole is not tied up on completion of the single wireless activity initiated by the request for text message transmission.

Message Architecture

Traditional device architecture for enabling use of radio hardware resources provides for function calls and similar software communication techniques between different components and layers that comprise the architecture. Such techniques usually require function calls to be made through application program interfaces. Normally, the component generating the function call is executing on the same device and platform as where the application program interface resides, as the use of function calls is integral within the device.

In contrast to a traditional approach, embodiments described herein provide for a message architecture for a computing device in which radio resources are to be used to enable wireless communications. In a message architecture, at least some of the components for enabling wireless activities communicate with one another with messages, rather than function calls or other similar programmatic mechanisms. As will be described, message communications between programmatic components has numerous benefits. These benefits may include, but not be limited to the following: (i) backward compatibility is enabled because messages can carry information about the application making the request; (ii) messages can be transferred from one environment to the other with ease, so that, for example, messages may be communicated between components on different devices, and (iii) messages can be queued and processed when received. With regard to FIG. 1, for example, one embodiment provides that the arbitration component 120 utilizes messages in arbitrating requests from multiple wireless applications.

Figure 2A:
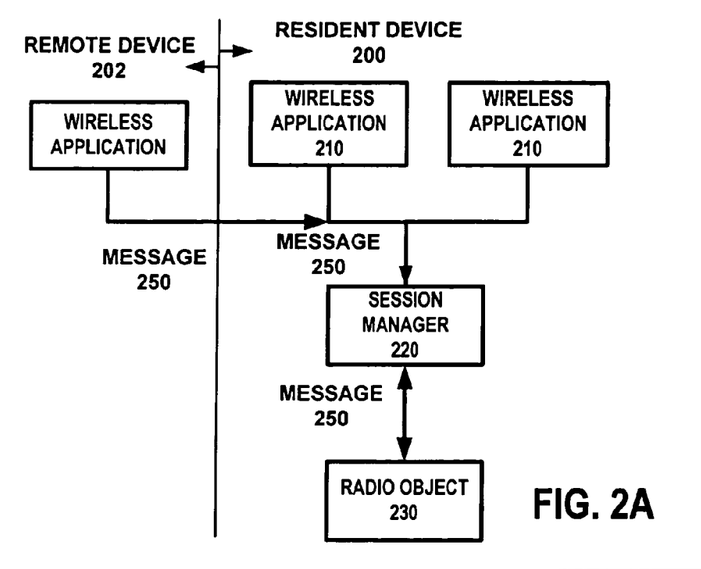
FIG. 2A illustrates a system that can be implemented on a wireless computing device, according to one embodiment of the invention.

FIG. 2A illustrates a system that can be implemented on a wireless computing device, according to one embodiment of the invention. In FIG. 2A, multiple wireless applications 210, as well as a session manager 220 and a radio object 230, are shown to reside on a device 200 ("resident device"). As described with FIG. 1, radio object 230 may provide a software interface that interconnects to wireless applications 210 to radio hardware components (not shown in FIG. 2A). The session manager 220 manages communications exchange between the wireless applications 210 and radio object 230. In one embodiment, one of the functions performed by session manager 220 is to provide the arbitration component, as described with FIG. 1. Additionally, as described elsewhere, the session manager 220 may determine which of the components of the radio object 230 should receive a particular request from one of the applications 210.

In a messaging architecture such as shown by FIG. 2A, session manager 220 communicates with radio object 230 using messages 250. For example, a request forwarded by session manager 220 may be in the form of a message, rather than a function call. Similarly, acknowledgments, responses, and incoming communications may be forwarded to the wireless applications 210 by session manager at 220 and/or radio object 230 using messages 250. Additionally, communications exchanged between the session manager 220 and the wireless applications 210 may also be communicated as messages 250.

Figure 2B:
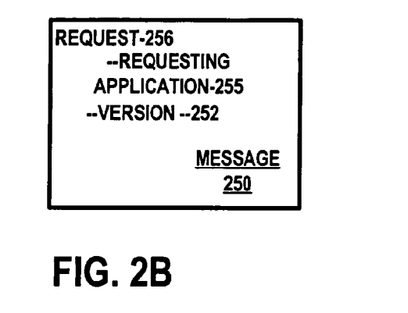
FIG. 2B illustrates a message 250 that can be communicated between two programmatic components, such as for example, the wireless application 210 and the session manager 220.

FIG. 2B illustrates a message 250 that can be communicated between two programmatic components, such as for example, the wireless application 210 and the session manager 220. The message 250 may carry with it information about the component that generated the message, including identification information 255 of the originating application. The message 250 may also include information 256 about the purpose of the communication. The identification information 255 may include a version identifier 252 which identifies the software version of the component that generated the message. Numerous other types of information may be included in the message to facilitate the receiving component to properly handle the request. For example, the information included in the message may identify or indicate a protocol, format, or process that the originating application utilizes. When the message architecture is implemented, components in the architecture can better handle and understand message requests from outdated components, as the message 250 provides information to enable the receiving components to understand and process the message request. As such, a message architecture such as shown and described enables for better backwards compatibility as elements in the architecture are updated over time.

In contrast, function calls and more traditional approaches are inherently limited in their ability to communicate identification information, such as the version of a component initiating a message request. Such traditional approaches develop compatibility issues over time, as newer applications or components develop difficulties in understanding how to handle function calls from outdated programs.

According to an embodiment the message 250 is generated and sent, it can be handled by the receiving component asynchronously. For example, an incoming message may be queued by the session manager 220 of FIG. 2A. As such, the message architecture inherently promotes the session manager's role in arbitrating requests for the radio objects. Additionally, the message architecture facilitates individual wireless applications 210 to issue message requests and not have subsequent processes delayed while waiting for the acknowledgement or response to the message request. In contrast, an architecture that uses function calls may require additional steps in enabling the requesting program to continue its operations while the function call is answered by the receiving component.

In an embodiment such as shown in FIG. 2A, message 250 may originate from a location that is remote to the resident device 200, but still be handled in similar fashion to messages generated from components within that device. For example, a remote device 202 may provide a wireless application, and the resident device 200 may carry a radio object and corresponding radio hardware to enable wireless activity based on use of that application. The remote device 202 may communicate a messaged request from the wireless application on that device to the resident device 200, using Bluetooth, WiFi, Infrared transmissions, or other communicative means. The resident device 200 may transmit or perform the wireless activity using the message of the request. For example, the application on the remote device 202 may be a text messaging application (e.g. email or SMS). An infrared or Bluetooth connection may transfer a message request from the remote device 202 to the resident device 200, with the message request conveying the recipient and the body of the message. The radio object 230 on the resident device 200 may form the packet or packets for the message, including the header and identifier and message body. The radio hardware on the resident device 200 may generate the outgoing text message using the format and protocol specified by the radio object 230.

Figure 2C:
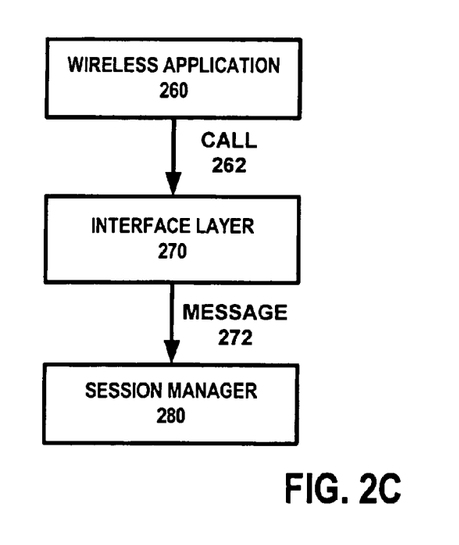
FIG. 2C illustrates an embodiment in which a wireless application 260 is not message-enabled, but generates calls 262 when making requests.

A message architecture such as illustrated by FIG. 2A assumes that all of the applications 210 that use the radio object 230 are messaged-enabled when communicating with the radio object. However, in practice, some or all components of the application layer 110 may require the ability to make function calls, or other forms of requests to the radio object 230 for purpose of making requests. FIG. 2C illustrates an embodiment in which a wireless application 260 is not message-enabled, but generates calls 262 when making requests. In one embodiment, an interface layer 270 may be provided that converts the calls 262 into messages 272. The messages 272 may then be forwarded onto the radio object, via the session manager 280.

An embodiment such as shown by FIG. 2C enables a computing device to run applications that utilize messages and applications that utilize function calls when seeking to communicate with the radio object 230 (see FIG. 2A). As described with FIG. 3 and elsewhere, embodiments of the invention may provide that radio object 230 is substantially modularized, meaning the programmatic constructs that form the object 230 may remain substantially static when it is implemented in different devices and with different platforms. For example, there are platforms that do not use the message architecture. An embodiment such as shown by FIG. 2C enables the radio object to maintain its construct and use of messages, even across platforms that use function calls.

Modularized Radio Object

Radio objects are typically software, or programmed elements, that accompany corresponding radio hardware modules. With past approaches, the radio object accompanying a particular radio hardware module (a CDMA chip set) had to be separately designed to accommodate the operating system and the device hardware. Under such past approaches, devices that were different in hardware (e.g. have different manufacturers) or in operating systems (e.g. POCKET PC manufactured by MICROSOFT CORP. and PALM OS manufactured by PALMSOURCE, INC.) had separately designed radio objects, even though such devices used the same basic radio hardware.

Under past practice, the use of such separately designed radio objects meant that the programmatic constructs for the radio object of the same radio hardware differed significantly from device to device, and platform to platform. As a result, radio object implementation in the past was relatively labor intensive and expensive to software designers and product manufacturers.

In contrast to the past approaches, embodiments described herein provide for a radio object that is substantially platform independent and device independent. Such a radio object is said to be modularized, in that significant portions of the radio object can be implemented in substantially the same form on different devices and platforms to accompany the same radio hardware module(s). When a radio object is implemented in the same form on different devices, the instance of the radio object on each device has substantially the same programmatic construct. Specifically, one embodiment provides that the radio object may have substantially the same code. This would mean that code statements may have the substantially similar syntax and perform at least nearly identical processes when compiled for use on different devices.

Figure 3:
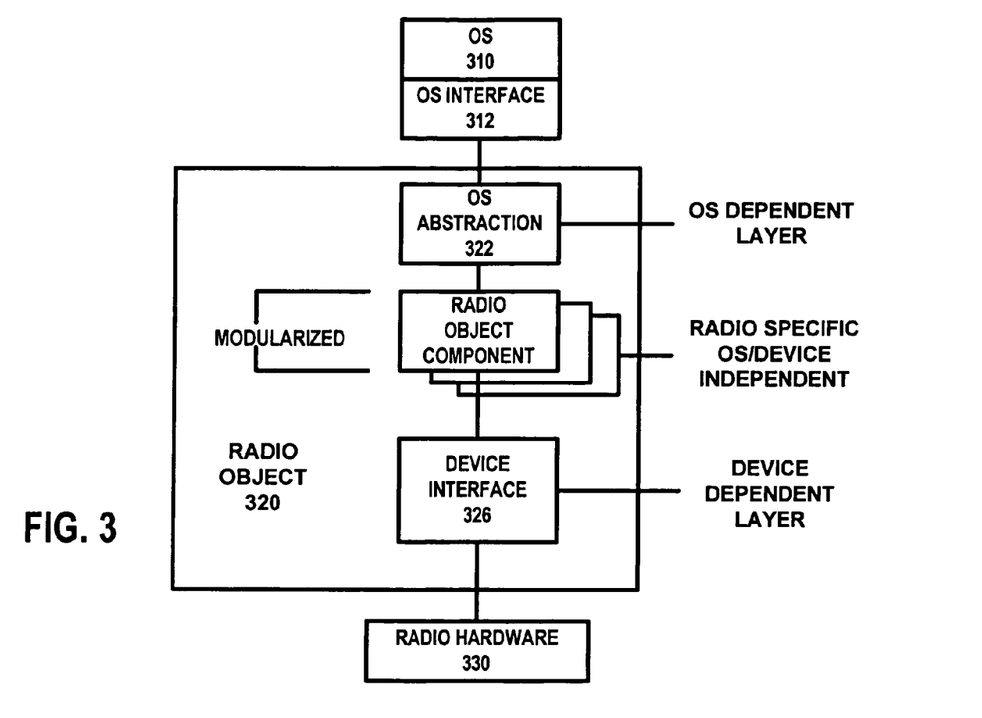
FIG. 3 illustrates an embodiment in which a modularized radio object is implemented on a wireless computing device, according to an embodiment of the invention.

FIG. 3 illustrates an embodiment in which a modularized radio object is implemented on a wireless computing device, according to an embodiment of the invention. In FIG. 3, a computing device runs an operating system 310 and includes radio hardware 330 for a particular type of wireless communications. A radio object 320 processes communications to and from the radio hardware 330. The radio object 320 is substantially or significantly modularized, so as to have portions that are both device and platform independent. As such, an embodiment provides that the radio object 320 is substantially configured for the radio hardware 330, rather than dependent on the requirements of the device or of the operating system 310.

The radio object 320 includes an OS abstraction 322, one or more radio components 324, and a device interface 326 or other device interface. The radio object 320 communicates with the radio hardware 330 using the device interface 326. In an embodiment, the primary processing components of the radio object 320 are the radio components 324, which are provided for individual applications for which wireless activity can be engaged. For example, as described in FIG. 4, an individual radio components 324 may handle requests from a specific application by formulating data packets that can be used by the radio hardware to generate or initiate a communication specified by that request.

While an embodiment shown by FIG. 3 provides for radio object 320 to include operating and devices interfaces, other embodiments may remove device and/or operating interfaces from the radio object altogether, so that the radio object 320 is a complete and modular component capable of being used on different types of devices and with different operating systems. In one embodiment, the OS abstraction 322 may be provided externally from the radio object 320 and provided as a separate component or functionality, or incorporated into the OS interface 312 or other component that is not the radio object 320. Similarly, the device interface 326 may be provided externally from the radio object 320 and also provided as a separate component or functionality to the radio object 320. In this way, construction of the radio object 320 is completely independent of the device type and operating system type, and the device interface 326 and the OS abstraction 322 can be provided separately. Furthermore, identical radio objects 320 may be created for various devices and various operating systems.

According to an embodiment, the radio components 324 are modularized, meaning that they comprise of code and execute processes that are independent of the platform and the device. The OS abstraction 322 may abstract the operating system 310 for communications exchanged between the radio object 320 and the operating system 310. These communications may include requests, acknowledgements, notifications and other forms of communications. Similarly, the device interface 326 may abstract the device profile for the radio object 320. Thus, anytime the radio object is to be implemented for a particular device and platform, the radio object 320 may employ the same radio components 324. Only the device interface 326 and the OS abstraction 322 need to be reformulated.

In addition to the OS abstraction 322, an operating system interface 312 may be needed to enable conversion of operating system specific communications (e.g. function calls and other requests) into a format or type that is conforming to the nature of the radio object 320. For example, as described with FIG. 2A-2C, the radio object 320 may communicate using messages, while the application layer programs issue requests using function calls. In such cases, the operating system interface 312 may enable communications between the radio object 320 and the application layer programs that are operating system specific in their capabilities. For example, the operating system interface 312 may translate function calls into messages, as described with FIG. 2C.

Furthermore, an embodiment provides that portions of the radio object 320 that are device independent and operating system independent are abstracted out into relatively defined components. The OS abstraction 322 may be dependent on the operating system 310, but device independent. The device interface 326 may be dependent on the device, but independent of the operating system 310. Consequently, the portion of the radio object 320 forming the OS abstraction 322 and the radio components 324 may be the same across different types of devices that have the same operating system 310. Similarly, the portion of the radio object 320 forming the radio components 324 and the device interface 326 may be the same on different devices, even when the different devices have different operating systems 310.

Figure 4:
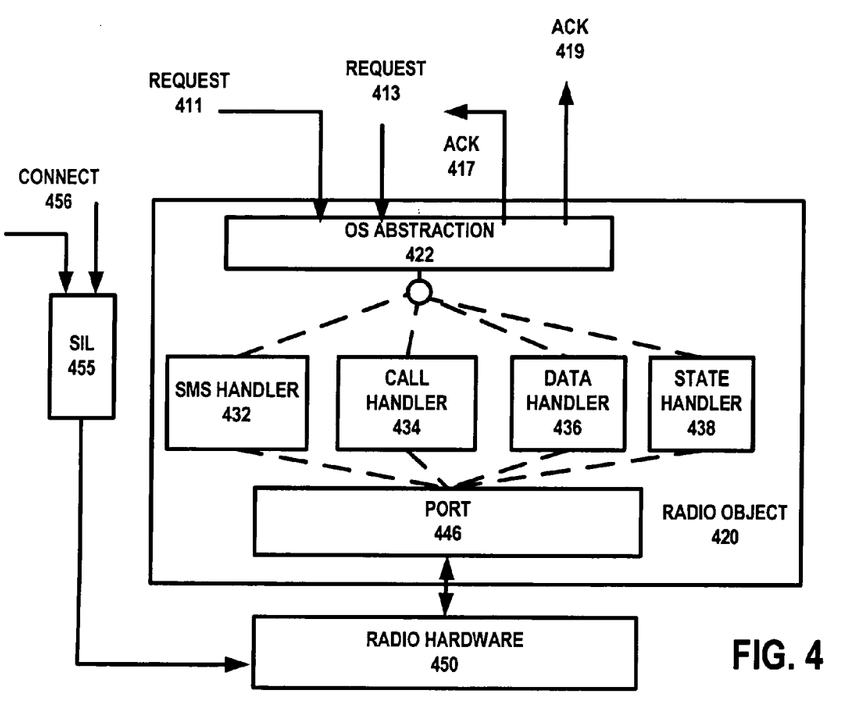
FIG. 4 illustrates components of a radio object such as described with FIG. 3 in greater detail, under an embodiment of the invention.

FIG. 4 illustrates components of a radio object such as described with FIG. 3 in greater detail, under an embodiment of the invention. In an embodiment shown by FIG. 4, a radio object 420 acts as an interface to radio hardware 450 on a computing device. The radio object 420 includes an OS abstraction 422, and multiple radio object components. In an implementation shown by FIG. 4, the multiple radio object components include an SMS handler 432, a call handler 434, a data handler 436, and a state handler 438. Additionally, the radio object includes a port 446 that interfaces with the device for purpose of communicating with the radio hardware 450.

In an embodiment, the port 446 may also correspond to the device interface 326. As such, the radio object components 432-428 and the port 446 are at least substantially platform-independent, and the port 446 and the radio object components 432-438 are at least substantially device independent. This means that a significant portion (e.g. 80% of the programmatic construct) is dependent only on the radio hardware 450 in use. In one embodiment, the design of a wireless computing device may include identifying a radio object 420 that is configured for the radio hardware 450 is use. Only the port 446 and the OS abstraction 422 are configured on a device model and platform case-by-case basis. The result is that the amount of program design is significantly reduced for when new devices (or device functionality) is introduced.

In an embodiment, the radio object 420 is implemented on a device and executed in connection with the use of wireless applications that generate and handle wireless activities. Wireless applications may generate requests 411, 413 to the radio object 420. The OS abstraction 422 handles the requests 411, 413 by determining which of a plurality of radio object components are to receive the requests 411, 413. In addition to handling requests, the OS abstraction 422 performs operations that are necessary based on the type or version of the operating system. For example, each operating system has its own procedures for performing management, including allocating free memory. In an embodiment, the operations performed by the OS abstraction 422 include making operating system requests for obtaining the proper amount of memory. The OS abstraction 422 may also perform operations of threading, where multiple programs run simultaneously in the operating system. The radio object 420 may run on its own thread. In general, threads are operating system specific. For example, how a thread is initiated, how it is maintained, how a thread is communicated with, and how a thread is terminated, are specific to the type and version of the operating system. The OS abstraction 422 establishes the thread with the operating system. Additionally, if different operating systems using different syntax, the OS abstraction 422 may perform syntax translation functions.

The SMS handler 432 is configured to handle communications that originate from or are intended for an SMS application. These communications may include outgoing messages, originating as a request 413 from an SMS application that resides on the device. Additionally, embodiments described herein contemplate the sharing of radio object 420 by more than one device. As such, the requests may originate as request 411 from another device for purpose of generating an outgoing message on the device in which the radio object 420 resides. In either case, a request for an outgoing message may result in the SMS handler 432 forming a packet using information contained in the request. The packet may conform to the protocol and format of the SMS protocol and format. The SMS handler 432 then communicates the prepared communication to the port 446, which then forwards the communication to the radio hardware 450. The SMS handler 432 is also configured to handle acknowledgements 419 from the radio hardware 450. The radio hardware 450 may issue acknowledgements 419 (and other internal communications) to correspond to events such as successful transmission of the message. The timing and manner in which acknowledgements are issued depend on the radio hardware 450. The SMS handler may 432 may include logic to handle different radio hardware 450. For example, the radio hardware 450 may not provide acknowledgements. In either case, the SMS handler 432 is configured to make the performance of the radio hardware 450 uniform to the higher application layers (e.g. the SMS application). The SMS handler 432 may also handle communications 417 that correspond to incoming messages from other devices. Such messages may first be received by the radio hardware 450, converted into a communication that the SMS handler 432 can translate for the receiving SMS application.

The call handler 434 is used to receive requests from applications that provide call functionality (a telephone application). The requests may specify that the radio hardware is to make a voice call. The request may include a phone number specified by the user when operating a phone application. The call handler 434 may form a packet that instructs the radio hardware 450 to place the call using the specified number. The radio hardware 450 may provide several acknowledgements 419 once the request is made. The acknowledgements may correspond to (i) the device is in a dialing state; (ii) the call connection has been established, and (iii) the call had terminated. Each of these acknowledgements 419 may be forwarded to the top layer application, to cause that application to act accordingly to the state of the radio communications. For example, once the radio hardware 450 is in a dialing state, the phone application may communicate the state. When the call is established, the next request for audio transmission may be handled outside of the radio object 420. A system interface layer (SIL) 460 may receive a call connect communication 456 (provided by the operating system or the top layer application) and route audio data to and from the phone application through audio hardware. Thus, audio data communicated after the call is connected may be handled outside of the radio object 420, using SIL 460, device audio hardware (not shown), and radio hardware 450. As such, the SIL 460 may be device and operating system dependent. In an embodiment, the SIL 460 may be reserved for performing certain device specific and/or operating specific functions, in addition to the routing of audio data. For example, some devices are capable of providing notifications through Light Emitting Diodes (LEDs). The SIL would be used to interface with device specific components that would cause the LED illumination, which may involve blinking speed and amber color depending on the nature of the communication that the LED illumination is to represent. In these and other cases, the component that handles device-specific tasks are external to the radio object.

The call handler 434 may also perform other functions. These other functions include establishing a call when the request for making the call is an incoming communication forwarded from the radio hardware 450. The incoming request may be communicated by the call handler 434 to the top layer application running on the device. Other functions that can be performed by the call handler 434 include handling incoming requests by the top layer application to accept or make multiple calls (e.g. call conferencing), responding to a request from the top layer application to swap phone calls, and sending up to the top layer application caller identification information ("Caller ID") in response to incoming phone calls. Such information may be rendered by the phone application for the user. Certain notifications, such as receipt of new voicemail, may also be communicated from the call handler 434 to the top layer applications.

The data handler 436 handles requests for making data connections. Such requests include, for example, requests from Internet browsing components, such as web browser or browser enabled media components executing on the device. The data handler 436 may also communicate responses from web sites and other network locations to the requesting component. Data handler 436 may also handle information such as the status of the data call, whether the signal strength, and timing of the data call.

The state handler 438 maintains state information pertaining to wireless communications and activities. In an implementation, the state handler 438 maintains information such as (i) whether the radio hardware 450 is on, (ii) whether the device is in service, (iii) carrier signal quality, and (iv) carrier display information. Other examples of information that can be maintained by the state handler 438 include information such as whether the speaker phone hardware is on, whether the muting of the phone application is on, and whether voice privacy call features are in use.

While an embodiment such as shown in FIG. 4 may provide for the radio object 420 to communicate and operate with the operating system through the OS abstraction 422, top layer applications may still run on the operating system, but not be compatible with the radio object 420. For example, a platform may integrate the operating system with the top layer applications, such that the top layer applications communicate only for native radio objects that are directly compatible with the operating system, without the use of the OS abstraction 422. To accommodate such top layer applications, an additional operating system interface may be provided between the radio object 420 and the operating system. The operating system interface converts communications that are in the form of the operating system's native radio object into a form of the modularized radio object described with FIG. 4.

In an embodiment shown by FIG. 4, distribution of functions and tasks amongst the various components is one of implementation. For example, the divide between what components perform which tasks may be blurred, or even altered, based on implementation and design of the radio object 420 and the radio hardware 450. For example, some radio objects may have the call handler 434 handle incoming voicemail notifications, while other radio objects may provide for the SMS handler 432. Still further, the distinction between different handlers may be merged in other implementations.

Multiple Radio Support

Embodiments of the invention contemplate wireless computing devices that operate using multiple radio hardware modules, where each radio hardware module enables communication activities on a particular type of network and/or protocol. In such instances, embodiments provide for intelligent, programmatic decision making on which radio objects to use in specific instances and conditions.

Figure 5:
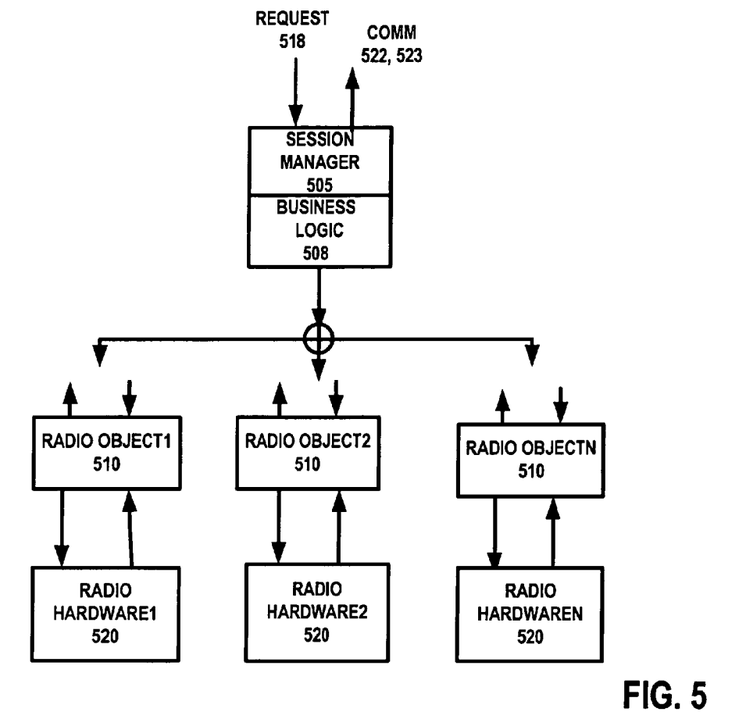
FIG. 5 illustrates a computing device on which multiple radio hardware modules are provided with support, under an embodiment of the invention.

FIG. 5 illustrates a computing device on which multiple radio hardware modules are provided with support, under an embodiment of the invention. In FIG. 5, support for multiple types of radio hardware modules 520 is provided with corresponding radio objects 510. Each radio hardware module 520 may enable wireless communication activities of a particular protocol, or on a type of network. In FIG. 5, a design implementation is assumed in which each radio object 510 is assumed to be for one corresponding radio hardware module 520. elsewhere.

A session manager 505 may provide an interface between the top layer applications and the radio objects 520. In an embodiment, session manager 505 performs functions of arbitrating requests from multiple applications in the application layer to one or more of the radio objects 510, as described with FIG. 1 and elsewhere. The session manager 505 may also be configured to provide the interface from applications that are OS-specific, as described with FIG. 3 and elsewhere.

According to an embodiment, a request 518 from one of the applications in the application layer may be handled by anyone of the radio objects 510. For example, a request to connect a call may be handled by a radio object for CDMA hardware, a radio object for GSM hardware, or even by the radio object for WiFi hardware (through VoIP). In an embodiment shown, the determination as to which radio hardware module 520 and corresponding radio object 510 is to receive a particular request may be made by business logic prior to the request being forwarded to one of the radio objects. According to one embodiment, session manager 505 includes business logic 508 for making a determination as to which radio object 510 and corresponding radio hardware module 540 is to receive a given request.

The business logic 508 may decide which radio object 510 and radio hardware module 520 ("radio path") is to receive a particular request for generating an outgoing communication be based on one or more of the following factors: (i) a cost associated with each radio path, (ii) the number of minutes individual paths have under a carrier plan, (iii) network availability for the type of communication provided from the radio path; (iv) signal strength of the network available for different paths; (v) preferences designated by the user; (vi) input provided by the user at the time the request is made (e.g. user specifies a VoIP call); (vii) the time of day in which the request is made; (viii) the application that is making the request; and (ix) the physical location of the user.

With regard to communications directed to the application layer, embodiments provide for communications 522 that are generated within the device, and communications 523 received from external sources. Communications generated from within the device may be in the form of acknowledgements or responses to requests generated from the application layer. Externally generated communications 523 may be received by whatever radio hardware module 520 that is active and can process the communication. Such communications may be forwarded up the chain from the radio hardware layer to the appropriate application at the application layer.

As mentioned, one motivation for including multiple radio hardware modules 520 is that different environments or conditions may favor use of one type of radio communications over another. For example, voice over Internet Protocol (VoIP) communications are generally inexpensive, but require an Internet connection and are preferably used in broadband mediums. CDMA networks are considered widely available and reliable cellular networks, but often expensive. As an example, the device 500 may include a first radio hardware module 512 for CDMA communications, and a second radio hardware module 512 for WiFi Internet connections. The first radio hardware module 512 may be used when the reliability and availability of the CDMA is preferred, while the second radio hardware module 514 may be used when a good WiFi connection is available. Through the second radio hardware module 514, VoIP phone calls may be made at much cheaper rates that the corresponding CDMA call.

An embodiment such as shown by FIG. 5 may be facilitated by radio objects 510 that are significantly modularized. As such, design and implementation of each radio object 510 is not made cumbersome with the need for programmatic constructs that are specific to both device and operating software on each radio object. Furthermore, an embodiment may employ functions and features described with other embodiments, including the use of arbitration and message architecture. Arbitration by the session manager 505, for example, facilitates the use of limited device resources when requests from multiple applications are made and possible through multiple radio paths. In addition, messaging communications between the application layer (not shown in this figure) and the session manager 505 enables the session manager 505 to better handle requests from various types of applications and application versions, thereby simplifying the process of radio path selection when multiple radio objects 510 are in use.

Additional Usage Cases

Figure 6:
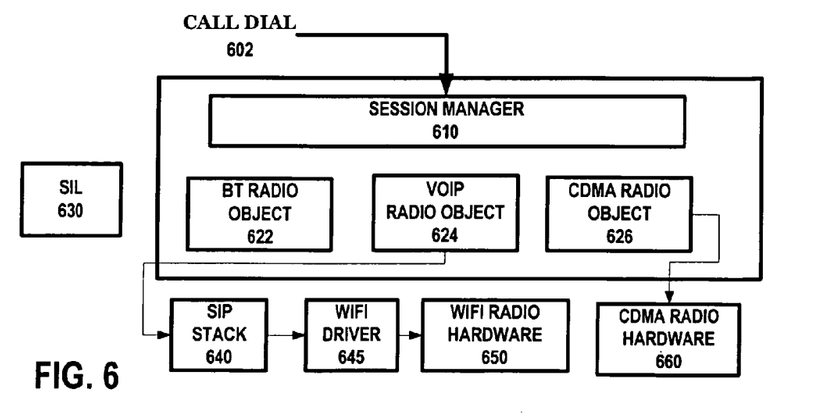
FIG. 6 illustrates an embodiment in which multiple radio objects are included in one device, and in which the type of radio communications used for a particular wireless activity is transparent to the user.

FIG. 6 illustrates an embodiment in which multiple radio objects are included in one device, and in which the type of radio communications used for a particular wireless activity is transparent to the user. In FIG. 6, a device includes a session manager 610, and multiple radio objects, and corresponding radio hardware for each of the radio objects. In an implementation shown, the device includes a Bluetooth radio object 622, a Voice over Internet Protocol (VoIP) radio object 624, and a CDMA radio object 626. In the case where a request from a top layer wireless application is a call connect request 602 (e.g. as generated by a phone application), multiple radio objects may respond and place the call. While an embodiment such as described provides for a request for wireless activity to be in the form of a call connect, other embodiments may implemented other types of requests, such as messaging requests.

One of the components is the VoIP radio object 624, which interfaces with WiFi hardware. The VoIP radio object provides the added functions of translating the request 602 into a VoIP request that can be handled by the WiFi hardware. The WiFi hardware may include a Session Initiated Protocol (SIP) 640 stack that handles requests and forwards them to a WiFi driver 645. The WiFi driver 645 interfaces with the WiFi radio hardware 650 so as to generate the wireless request for the Internet in order to create an Internet Protocol voice connection.

The CDMA radio object 626 may handle the call connect request 602 in a manner described with other embodiments. A CDMA Radio hardware 660 may be used for when the call connect request 602 results in the placement of a CDMA call. The Bluetooth radio object 622 may be used for device to device communications.

With features and functionality described in this application, embodiments of the invention enable the selection and use of the radio objects to be transparent from operation of the top layer application. For example, the phone application that generates the call connect request 602 may behave the same whether the call connect is made via VoIP or CDMA. The session manager 610 may handle the request 602, and using logic such as described in FIG. 5, select one of the radio objects to handle the call connect request 602. For example, if WiFi is available, the session manager 610 may automatically select the VoIP radio object 624.

In an embodiment, the radio objects are significantly device and platform independent. As such, the configuration of the top layer application that generates the request 602 is not material. For example, the application may be operating system specific, while significant portions of the radio object are not. In one embodiment, the request 602 can be generated from a paired device. The paired device may have the same or different device profile or platform. The request 602 may be transmitted through, for example, the Bluetooth radio on the device.

According to an embodiment, a device such as shown by FIG. 6 may be paired, or made communicative with other devices that can use some or all of its radio resources. Thus, for example, a phone application may be provided on a device that can only communicate to another device through Bluetooth or Infrared, or by wireline. But operation of the phone application results in the call connect request 602 establishing a call. This is facilitated by the radio object being device independent. Even if the requesting device has a different platform, it can be accommodated by OS interfaces and abstraction components that configure the radio object components for the alternative platforms. Furthermore, the message architecture described with FIG. 2 may be implemented in an embodiment such as described to facilitate such requests between devices. As noted in FIG. 3, message requests carry identification and version information, and can be communicated more easily in asynchronous fashion. Once the call is established, subsequent acknowledgements (e.g. call placed) are handled by the radio object so as to enable communication with the application layer independent of the device profile or platform.

Once one of the radio objects is used to place the call, an embodiment provides that audio data may be routed to the radio hardware of the selected radio object when the call takes place. A SIL 630 may be used to establish the routes of the audio data outside of the radio object. As mentioned, the SIL 630 is device and platform dependent. More than one SIL 630 may be used. For example, each radio object may have its own SIL 630.

Numerous alternative embodiments are contemplated herein. Among them, while embodiments described above provide for wireless activities that pertain primarily to phone calls and messaging, it should be notes that radio objects may be used for other types of data transfers, including, for example, audio and video (e.g. streaming audio).

Additionally, embodiments described herein contemplate implementations in which radio objects can be added to devices in order to increase their functionality downstream from the manufacturing stage. For example, an embodiment contemplates the ability for a user to add a radio object 320 (see FIG. 3), along with any integrated or externally provided operating system abstraction and device interface. Alternatively, the addition of the radio object 320 may be done by a vendor or cellular carrier using a standardized product, so that radio object functionality is determined by the vendor or cellular carrier. The modularization of the radio object, where radio objects have similar or even identical programmatic constructs, even when different devices and operating systems are used, enable such downstream configurations.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A computing device comprising:
a plurality of radio modules to transmit and receive wireless communications; and
processing and memory resources that, in combination or individually, provide logic and programming, wherein the logic and programming comprises:
multiple applications that are operable by a user on the computing device;
a plurality of radio objects that interfaces the multiple applications with the plurality of radio modules, each of the plurality of radio objects corresponding to a radio module of the plurality of radio modules; and
an arbitration component that arbitrates at least one of (i) requests made by at least one of the multiple applications to at least one of the plurality of radio objects for access to a corresponding at least one of the plurality of radio modules, or (ii) responses from at least one of the plurality of radio objects to requests made by the at least one of the multiple applications.

2. The computing device of claim 1, wherein the arbitration component arbitrates a request made by at least one of the multiple applications by determining which radio object from the plurality of radio objects and corresponding radio module is to receive the request.

3. The computing device of claim 2, wherein the arbitration component determines which radio object from the plurality of radio objects and corresponding radio module is to receive the request based on at least one of: (i) network availability for a type of communication provided by a radio object and a corresponding radio module, (ii) signal strength of a network of a radio object and a corresponding radio module, (iii) preferences designated by the user, or (iv) input provided by the user at a time the request is made.

4. The computing device of claim 1, wherein the arbitration component forwards requests made by at least one of the multiple applications to at least one of the plurality of radio objects using messages.

5. The computing device of claim 4, wherein at least one of the multiple applications communicate with at least one of the plurality of radio objects using messages.

6. The computing device of claim 4, wherein at least one of the multiple applications communicate with at least one of the plurality of radio objects using function calls, and wherein the processing and memory resources, in combination or individually, further provide an interface that converts each function call to a corresponding message.

7. The computing device of claim 1, wherein at least one of the plurality of radio modules includes (i) components for coding, modulating, amplifying, and radiating outgoing wireless communications, or (ii) components for receiving, amplifying, demodulating, and decoding incoming wireless communications.

8. The computing device of claim 1, wherein each of the plurality of radio modules includes components for transmitting and receiving wireless communications using a particular wireless communication medium and protocol.

9. The computing device of claim 8, wherein the particular wireless communication medium and protocol corresponds to a medium and protocol selected from a group comprising: (i) wireless fidelity (WiFi), (ii) Bluetooth, (iii) code division multiplex (CDMA), (iv) global system for cellular technology (GSM), and (v) time division multiplex (TDMA).

10. The computing device of claim 1, wherein the multiple applications include applications selected from a group comprising: (i) an email application, (ii) a web browsing application, (iii) a short message service (SMS) application, (iv) a multimedia message service (MMS) application, and (v) a phone application.

11. A method for enabling radio operations on a computing device, the method being performed by one or more processors and comprising:

operating multiple applications on the computing device;

implementing a plurality of radio objects that interfaces the multiple applications with a plurality of radio modules of the computing device, each of the plurality of radio objects corresponding to a radio module of the plurality of radio modules; and arbitrating at least one of (i) requests made by at least one of the multiple applications to at least one of the plurality of radio objects for access to a corresponding at least one of the plurality of radio modules, or (ii) responses from at least one of the plurality of radio objects to requests made by the at least one of the multiple applications.

12. The method of claim 11, wherein at least one of the plurality of radio modules includes (i) components for coding, modulating, amplifying, and radiating outgoing wireless communications, or (ii) components for receiving, amplifying, demodulating, and decoding incoming wireless communications.

13. The method of claim 11, wherein each of the plurality of radio modules includes components for transmitting and receiving wireless communications using a particular wireless communication medium and protocol.

14. The method of claim 13, wherein the particular wireless communication medium and protocol corresponds to a medium and protocol selected from a group comprising: (i) wireless fidelity (WiFi), (ii) Bluetooth, (iii) code division multiplex (CDMA), (iv) global system for cellular technology (GSM), and (v) time division multiplex (TDMA).

15. A cellular device comprising:

a plurality of radio modules to transmit and receive wireless communications, the plurality of radio modules transmitting and receiving the wireless communications using at least a cellular communication medium and protocol; and processing and memory resources that, in combination or individually, provide logic and programming, wherein the logic and programming comprises:

multiple applications that are operable by a user on the cellular device;

a plurality of radio objects that interfaces the multiple applications with the plurality of radio modules, each of the plurality of radio objects corresponding to a radio module of the plurality of radio modules; and an arbitration component that arbitrates (i) requests made by each of the multiple applications to at least one of the plurality of radio objects for access to a corresponding at least one of the plurality of radio modules, and (ii) responses from at least one of the plurality of radio objects to requests made by each of the multiple applications.

* * * * *